United States Patent [19]

Achelpohl et al.

[11] Patent Number: 4,643,657
[45] Date of Patent: Feb. 17, 1987

[54] APPARATUS FOR COOLING TUBULAR PLASTIC FILMS EXTRUDED FROM A FILM BLOWING HEAD

[75] Inventors: Fritz Achelpohl; Hartmut Upmeier, both of Lengerich, Fed. Rep. of Germany

[73] Assignee: Windmoller & Holscher, Lengerich, Fed. Rep. of Germany

[21] Appl. No.: 780,954

[22] Filed: Sep. 27, 1985

[30] Foreign Application Priority Data

Oct. 8, 1984 [DE] Fed. Rep. of Germany ....... 3436881

[51] Int. Cl.$^4$ ............................................. B29C 55/28
[52] U.S. Cl. .................................. 425/72 R; 264/565; 264/566; 264/569; 425/326.1; 425/387.1; 425/388
[58] Field of Search .................. 425/72 R, 326.1, 388, 425/387.1; 264/569, 565, 566

[56] References Cited

U.S. PATENT DOCUMENTS

| | | | |
|---|---|---|---|
| 3,412,189 | 11/1968 | Sullivan | 425/326.1 X |
| 3,752,612 | 8/1973 | Van Duuren | 264/569 X |
| 3,898,028 | 8/1975 | Upmeier | 425/72 R X |
| 3,976,411 | 8/1976 | Rahlfs | 425/326.1 X |
| 3,990,828 | 11/1976 | Reifenhauser | 425/326.1 |
| 4,080,143 | 3/1978 | Upmeier | 425/72 R X |
| 4,105,380 | 8/1978 | Zimmermann | 425/72 R |
| 4,236,884 | 12/1980 | Schott, Jr. | 425/72 R |
| 4,473,527 | 9/1984 | Fujisaki et al. | 425/72 R X |

FOREIGN PATENT DOCUMENTS

| | | | |
|---|---|---|---|
| 1224471 | 9/1966 | Fed. Rep. of Germany | 425/326.1 |
| 2009914 | 9/1971 | Fed. Rep. of Germany | 425/72 R |
| 3311932 | 10/1984 | Fed. Rep. of Germany | 425/72 R |
| 3335334 | 4/1985 | Fed. Rep. of Germany | 425/72 R |
| 58-42431 | 3/1983 | Japan | 425/72 R |

Primary Examiner—Richard L. Chiesa
Attorney, Agent, or Firm—Fleit, Jacobson, Cohn & Price

[57] ABSTRACT

Apparatus for cooling tubular plastic films extruded from a film blowing head. Air cooling means consisting of co-axial pipes extending axially through the film blowing head supply the cooling and inflating air and withdraw the same from the inflated parison. Vertically inner cooling rings are disposed substantially concentrically to the axis of the parison downstream of the annular extrusion die orifice of the blowing head. The inner cooling rings define nozzle gaps and have air guiding surfaces, which face the wall of the parison and are convexly curved in a longitudinal section of the inner cooling rings and during the operation of the apparatus are swept by the cooling air blown out of said nozzle gaps. An outer cooling air jet concentrically surrounds the extruded parison and serves to blow air in a direction which is approximately parallel to the direction of travel of the parison. The inner cooling rings are concentric to the parison. A telescopic inner pipe is provided and includes axially spaced annular gaps serving to withdraw the cooling and inflating air. The outside diameter of the lowermost internal cooling ring is substantially as large as the inner diameter of the annular extrusion die orifice. The diameters of the inner cooling rings progressively decrease in an upward direction so that the parison will assume an upwardly tapering, frustoconical shape having a small included angle before it is inflated.

2 Claims, 2 Drawing Figures

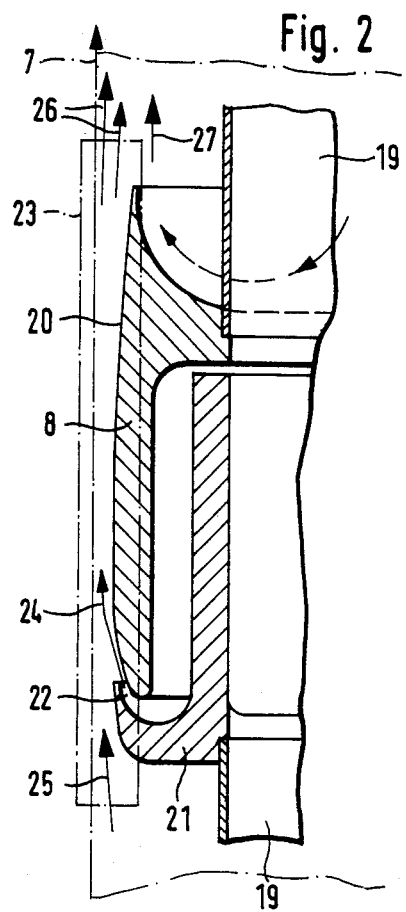

APPARATUS FOR COOLING TUBULAR PLASTIC FILMS EXTRUDED FROM A FILM BLOWING HEAD

BACKGROUND OF THE INVENTION

1. Field of the Invention

This invention relates to apparatus for cooling tubular plastic films extruded from a film blowing head. The invention includes air cooling means consisting of coaxial pipes extending axially through the film blowing head to supply the cooling and inflating air and to withdraw the same from the inflated parison. Vertically spaced apart inner cooling rings are disposed substantially concentrically to the axis of the parison downstream of the annular extrusion die orifice of the blowing head, and the inner cooling rings together with annular members define nozzle gaps and have air guiding surfaces, which face the wall of the parison and are convexly curved in a longitudinal section of the inner cooling rings. During the operation of the apparatus the air guiding surfaces are swept by the cooling air blown out of the nozzle gaps, and the cooling air flows approximately parallel or at an acute angle to the direction of travel of the parison. The cooling means also include outer cooling means, which concentrically surround the extruded parison and comprise an outer cooling ring defining an annular nozzle gap, which is adjacent to and downstream of the annular extrusion die orifice and serves to blow air in a direction which is approximately parallel to the direction of travel of the parison. An apertured baffle plate or shield is provided, which surrounds the parison below its expanding portion adjacent to the down-stream end of the cooling path defined by the inner cooling rings, and the baffle plate or shield in an axial projection on the inflated tubular film covers at least the inner portion of the expanding portion of the parison. The baffle plate or shield has an annular inner edge, which together with the wall of the parison defines an annular gap.

2. Description of the Prior Art

Cooling apparatus has been disclosed in German Pat. No. 3,335,334. By means of that known cooling apparatus the parison can be sufficiently cooled over the length of the cooling path defined by the inner cooling rings, so that after that cooling path the parison can be inflated with a high inflation ratio and damage of the expanding portion of the parison will be avoided. For this reason the cooling apparatus in accordance with the above-mentioned patent can be used to make blown tubular films of high strength, e.g., from polyethylene having a low or higher density because the parison will be longitudinally stretched over the length of the cooling path, in which path the parison has the shape of a bottleneck, and the parison can subsequently be inflated with a high inflation ratio. Owing to the strong cooling action, that high inflation ratio can be achieved adjacent to the neck formed in the parison under its expanding portion. In the cooling apparatus in accordance with the above-mentioned patent, the vertically spaced apart inner cooling rings having convex air guiding surfaces stabilise the parison so effectively adjacent to its bottleneck that it can be swept on the outside with a sharp enveloping cylindrical cooling air jet, which necessarily creates turbulence. A destruction of the inflated parison by this sharp cooling air jet is prevented by the baffle plate or shield which deflects the external cooling air jet radially outwardly and thereby protects the expanding parison. The annular gap formed between the edge of the hole in the baffle plate or shield and the parison is so dimensioned that only an air jet of reduced energy can pass therethrough, to contribute to a further cooling of the expanding parison. The air jet is throttled in the annular gap and simultaneously smoothened so that it will cool the expanding parison without damaging the same.

SUMMARY OF THE INVENTION

It is an object of the invention so to improve the cooling apparatus according to the above-mentioned patent that blown tubular films of still higher strength can be made.

This object is accomplished in accordance with the invention in that the inner cooling rings concentrically surround the tube serving to withdraw the cooling and inflating air, the inside diameter of the lowermost internal cooling ring is substantially as large as the diameter of the annular extrusion die orifice, and the diameters of the inner cooling rings above said lower-most inner cooling ring progressively decrease in an upward direction so that the parison will assume an upwardly tapering, frustoconical shape having a small included angle before it is inflated. In the apparatus in accordance with the invention the neck formed in the parison is caused to radially contract to a relatively small diameter before the parison is inflated. A tubular film which has thus been made will have a higher strength than a tubular film which just before it is inflated has approximately the same diameter than the annular extrusion die orifice. In that context the included angle is the angle between the generatrices of the cone in an axial sectional view. In spite of the frustoconical taper of the extruded parison the inner and outer cooling means of the apparatus in accordance with the invention permit such an effective cooling adjacent to the neck formed in the parison that the parison can be inflated with a high inflation ratio.

Within the scope of the invention the flow rate of cooling air can be increased in that adjacent to the inner cooling rings the pipe for withdrawing the cooling and inflating air consists of pipe sections which decrease in diameter in an upward direction so that entrance openings consisting of annular gaps are formed between adjacent pipe sections. The pipe sections may be telescoped.

BRIEF DESCRIPTION OF THE DRAWINGS

FIG. 2 is an enlarged longitudinal sectional view showing an inner cooling ring.

DETAILED DESCRIPTION OF THE PREFERRED EMBODIMENT

Figure 1:
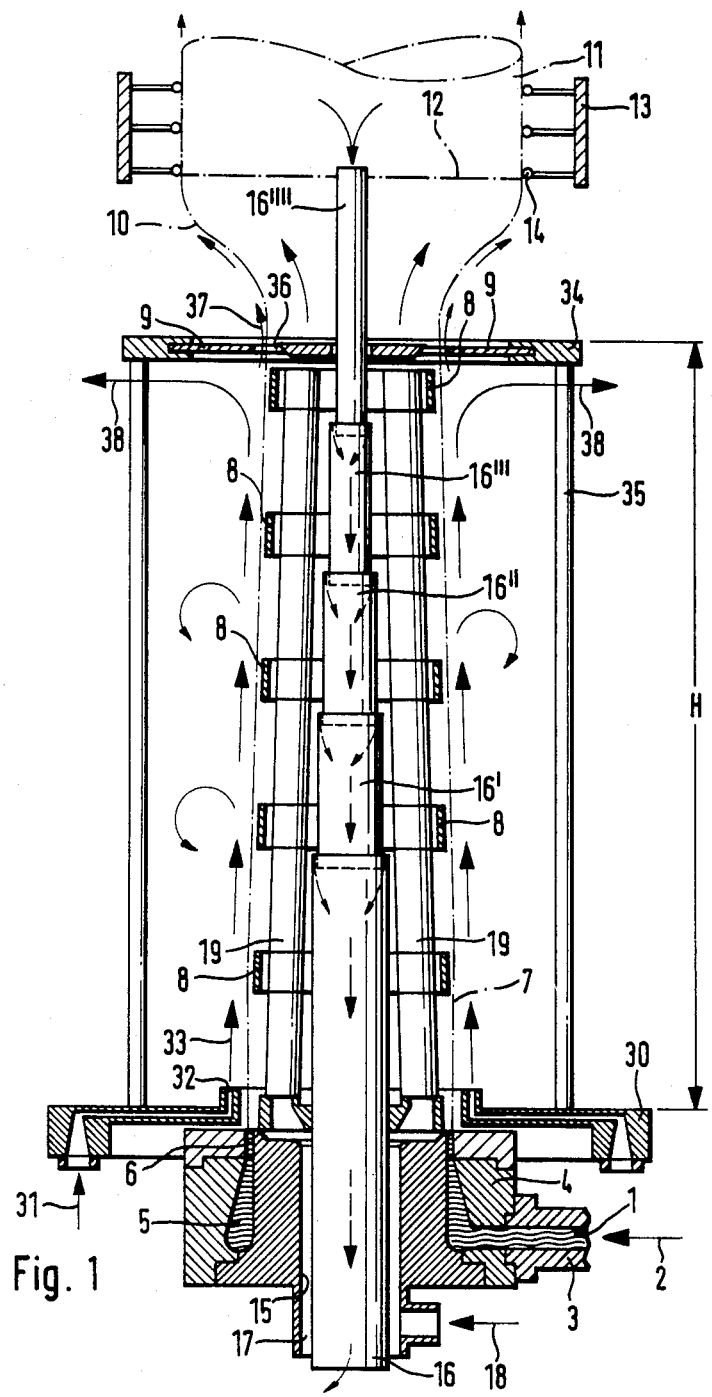
FIG. 1 is a longitudinal sectional view showing a film blowing head and the cooling apparatus.

An illustrative embodiment of the invention will now be described in more detail with reference to the drawings.

In the direction of the arrow 2 (see FIG. 1), molten plastic material 1 is discharged by an extruder, not shown, and through a connecting flange 3 is laterally fed into the blow head housing 4, which contains an annular passage 5 for the molten material. That passage may be designed as is known from German Patent Specification No. 20 09 914. In the annular extrusion die orifice 6 formed in the film blowing head, the molten plastic material is extruded to form the parison 7, which assumes a tapering frustoconical shape over a height H which is equal to at least five times the diameter the annular extrusion die orifice 6.

Adjacent to the uppermost inner cooling ring 8, the parison 7 passes through the hole in the iris diaphragm 9 and is subsequently inflated in the short radial inflation zone 10 to the full diameter of the inflated tubular film 11. The inflated tubular film 11 is subsequently flattened, withdrawn and wound up.

The inner cooling rings 8 decrease in diameter in an upward direction from the lowermost inner cooling ring. As a result, the parison 7 withdrawn around the inner cooling rings 7 assumes a frustoconical shape over the length of the cooling path defined by the inner cooling rings 8. Adjacent to the upper end of the cooling path the diameter of the parison 7 may amount to about one-half of the diameter of the annular extrusion die orifice.

On the outside of the inflated tubular film 11, a film sizing device 13 comprising backing elements 14 is provided on the level 12 on which the parison solidifies.

The film blowing head 4 which is laterally supplied with the molten plastic material is formed at its centre with a large passage bore 15, which together with the withdrawing pipe 16 defines a concentric annular passage 17. Cooling air is blown into said annular passage in the direction of the arrow 18 by a fan, not shown. From the annular passage 17 the cooling air flows through cooling air pipes 19 into the diagrammatically indicated inner cooling rings 8, which are vertically spaced apart and are interconnected by pipes 19. The air-guiding outer surfaces of the inner cooling rings 8 are so shaped from an aerodynamical aspect that they exert on the plastically deformable, soft parison 7 a radially inwardly directed suction force. The design of each inner cooling ring 8 is apparent from FIG. 2.

Adjacent to the cooling path defined by the inner cooling rings 8, the withdrawing pipe 16 is composed of pipe sections 16', 16'', 16''' and 16'''', which decrease in diameter in an upward direction and extend telescopically into each other so that adjacent pipe sections define entrance openings consisting of annular gaps.

The pipe sections may be provided with spokelike webs (not shown), which connect adjacent pipe sections to each other and, if desired, connect the pipe sections to the inner cooling rings.

The inner cooling ring 8 shown in FIG. 2 in a fragmentary longitudinal sectional view is formed on that side which faces the inside surface of the extruded parison 7 with an air-guiding surface 20, which is convexly curved like the suction side of an airfoil. In the direction of flow of the cooling air, the inner cooling ring 8 is preceded by a slatlike ring 21, which overlaps the adjacent end of the inner cooling ring 8 and defines with the latter an annular gap 22, which faces in the direction in which the air flows onto the airfoil-shaped air-guiding surface of the cooling ring 8 so that said gap is at an acute angle to the wall of the parison 7. The cooling portions of the cooling ring 8 and of the slatlike ring 21 are indicated by a dash-dot boundary line 23 and are substantially designed like the external surface of an airplane wing provided with a Junkers slat.

The main air stream is blown from the gap 22 between the slatlike ring 21 and the inner cooling ring 8, and owing to its high velocity it exerts a suction force which stabilizes the parison 7 that is to be cooled. On the side facing the parison 7, the cooling ring 8 and the slatlike ring 21 together constitute an annular airfoil.

Owing to the injector effect of the air jet 24, an additional airstream 25 for assisting the cooling and the guidance of the air is sucked over the outer surface of the slatlike ring 21.

The airfoillike cooling ring 8 causes the cooling air to flow at the trailing end of the air-guiding surface 20 in the direction of the arrows 26 with only negligible turbulence. The air 27, which is under negative pressure on the underside of the airfoil, is deflected without turbulence to flow approximately parallel to the parison 7 in the same direction as the cooling air.

The parison is cooled on the outside by means of the outer cooling ring 30, which is supplied with external cooling air in the direction of the arrow 31 by a fan, not shown. That external cooling air is delivered by the outer cooling ring 30 in the form of a concentric sharp air jet 33 through the exit gap 32, having raised exit lips, and flows parallel to the outer surface of frustoconical parison 7.

A holder 34 for the iris diaphragm 9 is provided on the level of the uppermost inner cooling ring 8 and is supported on the outer cooling ring 30 by rods 35 or the like. The hole in the iris diaphragm 9 defines with the slender neck of the parison an annular gap 36, through which the remaining stream 37 of the external cooling air is passed to cool the parison in the inflating zone 10. A major part of the external cooling air 33 is deflected by the iris diaphragm 9 in a radially outward direction, indicated by the arrows 38.

The heated internal cooling air which has flown past the inner cooling rings 8 enters the interior space within inflated tubular film 11 and is sucked off through the central pipe as heated air by a fan, not shown, in order to increase the cooling effect.

For the start-up of the film blowing plant, the iris diaphragm may be fully opened in order to facilitate the threading of the leading end of the parison through the iris diaphragm. In dependence on the output rate of the extruder or the velocity at which the film is taken off, the iris diaphragm is then closed to such an extent that residual cooling air at an adequate rate for the cooling of the inflation zone 10 can flow through the annular gap. To permit an adaptation of the iris diaphragm to changed output rates or take-off speeds, the height of the iris diaphragm over the die orifice 6 may be varied.

The illustrated cooling apparatus permits the use of an outer cooling ring for delivering a stream of cooling air which flows at high velocity along the long, slender neck of the parison. In spite of turbulences which arise, that sharp external cooling air stream cannot damage the parison, which although still soft and plastically deformable, is stabilized by the specially profiled, vertically spaced apart internal cooling rings, which exert on the parison a radially inwardly directed suction force.

The parison cannot be damaged by the sharp stream of external cooling air in the inflating zone 10 because that stream impinges on the iris diaphragm 9, which deflects a major part of the stream in an outward direction and permits the passage of only a residual air stream for cooling.

We claim:

1. Apparatus for cooling tubular plastic films extruded from a film blowing head, comprising: a film blowing head having an annular extrusion die orifice; air cooling means including a plurality of pipes extending from the film blowing head to supply cooling and inflating air for cooling and inflating the film, and a pipe extending from the film blowing head and within the tubular film to withdraw the air from an inflated tubular film; a plurality of vertically spaced apart inner cooling rings disposed substantially concentrically to the axis of and downstream of the annular extrusion die orifice of the blowing head, wherein the inner cooling rings include annular members that define inner nozzle gaps and that have air guiding surfaces which face the inner surface of the film and are convexly curved in a longitudinal section of the inner cooling rings, and which surfaces during the operation of the apparatus are swept by cooling air blown out of said nozzle gaps, said cooling air blown out of said nozzle gaps flows approximately parallel to the direction of travel of the film; said cooling means also including outer cooling means, which concentrically surround the extrusion die and include an outer cooling ring defining an annular outer nozzle gap, which is adjacent to and downstream of the annular extrusion die orifice and serves to direct air along the inner surface of the film and in a direction which is approximately parallel to the direction of travel of the film; an apertured baffle plate spaced downstream from the film blowing head and surrounding the film below a radially outwardly expanded portion adjacent to a downstream end of the cooling path defined by the inner cooling rings, wherein said baffle plate in an axial projection on the axial projection of the expanded portion of the inflated tubular film covers at least the outer portion of the expanded portion of the film, and said baffle plate has a substantially circular inner edge which together with the wall of the film defines an annular gap; wherein the inner cooling rings are concentrically enclosed within the tubular film and surround the pipe serving to withdraw the cooling and inflating air, the outside diameter of the lowermost internal cooling ring is substantially as large as the inner diameter of the annular extrusion die orifice, and the diameters of the inner cooling rings above said lowermost inner cooling ring progressively decrease in a downstream direction relative to the blowing head so that the tubular film will assume an upwardly and inwardly tapering, frustoconical shape having a small included angle before it is inflated to its radially outwardly expanded condition downstream of the baffle plate.

2. Cooling apparatus according to claim 1, wherein the pipe for withdrawing the cooling and inflating air includes a plurality of substantially coaxial pipe sections which decrease in diameter in a downstream direction so that a plurality of spaced, annular entrance openings are formed between adjacent pipe sections.

* * * * *